(12) United States Patent
Huang

(10) Patent No.: US 9,116,413 B2
(45) Date of Patent: Aug. 25, 2015

(54) ELECTRO-OPTIC MODULATOR

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/273,556

(22) Filed: May 9, 2014

(65) Prior Publication Data
US 2014/0334765 A1   Nov. 13, 2014

(30) Foreign Application Priority Data

May 9, 2013   (TW) .............................. 102116481 A

(51) Int. Cl.
*G02F 1/035*   (2006.01)
*G02F 1/225*   (2006.01)
*G02F 1/21*    (2006.01)

(52) U.S. Cl.
CPC .......... *G02F 1/225* (2013.01); *G02F 2001/217* (2013.01)

(58) Field of Classification Search
CPC . G02F 1/225; G02F 1/2255; G02F 2001/212; G02F 1/025; G02F 1/2257; G02F 1/035

USPC .......................................... 385/1, 2, 3, 4, 8, 9
See application file for complete search history.

(56) References Cited

U.S. PATENT DOCUMENTS

| 6,907,169 B2 * | 6/2005 | Vahala et al. .................. 385/50 |
| 2008/0212915 A1 * | 9/2008 | Ichikawa et al. ................. 385/3 |

* cited by examiner

*Primary Examiner* — Jennifer Doan
(74) *Attorney, Agent, or Firm* — Novak Druce Connolly Bove + Quigg LLP

(57) ABSTRACT

Electro-optic modulator includes a substrate, a waveguide formed in a top surface of the substrate, first modulating electrodes and second modulating electrodes. The waveguide includes a Y-shaped incident member, a Y-shaped output member, and first and second connection members. The Y-shaped incident member includes an incident portion, first and second incident branches. The Y-shaped output member includes an output portion, a first and second output branches. The first connection member includes a first branch and a second branch. The second connection member includes a third branch and a fourth branch. The first branch and the second branch are interconnected between the first incident branch and the first output branch and arranged in parallel. The third branch and the fourth branch are interconnected between the second incident branch and the second output branch and arranged in parallel.

10 Claims, 2 Drawing Sheets

ELECTRO-OPTIC MODULATOR

FIELD

The present disclosure relates to integrated optics and, particularly, to an electro-optic modulator.

BACKGROUND

Electro-optic modulators change refractive index of a branch of a waveguide (hereinafter the modulated branch) by an electro-optic effect of a modulating electric field. Thus, the electro-optic modulator can alter a phase of light waves traversing the modulated branch. As a result, a phase shift is generated between the light waves traversing the modulated branch and light waves traversing another branch of the waveguide (hereinafter the non-modulated branch). The light waves traversing the modulated branch interface with light waves traversing the non-modulated branch. Output energy of the light waves of the waveguide is modulated as the output energy depends on the phase shift, which in turn depends on the modulating electric field. The light waves have transverse electric wave (hereinafter the TE mode) and transverse magnetic waves (hereinafter the TM mode). A modulating efficiency of the electro-optic modulator is determined by modulating the TE mode and the TM mode.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
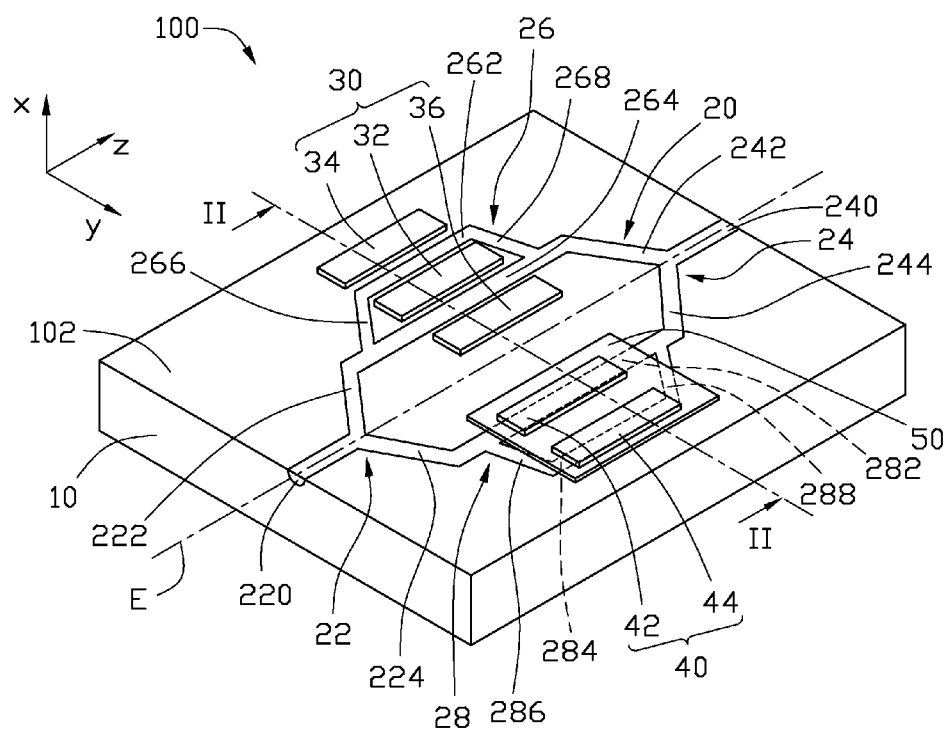
FIG. 1 is an isometric, schematic view of an electro-optic modulator, according to an exemplary embodiment.

FIG. 1 illustrates an electro-optic modulator 100 in accordance with an exemplary embodiment. The electro-optic modulator 100 includes a substrate 10, a waveguide 20, a pair of first modulating electrodes 30, and a pair of second modulating electrodes 40.

The substrate 10 includes a top surface 102. The substrate 10 is made of lithium niobate ($LiNbO_3$) crystal to increase a bandwidth of the electro-optic modulator 100, the $LiNbO_3$ crystal has a high response speed.

The waveguide 20 is formed in the top surface 102 by high temperature diffusion technology. The waveguide 20 includes a Y-shaped incident member 22, a Y-shaped output member 24, a first connection member 26, and a second connection member 28.

The Y-shaped incident member 22 includes an incident portion 220, a first incident branch 222, and a second incident branch 224.

The Y-shaped incident member 24 includes an output portion 240, a first output branch 242, and a second output branch 244.

The first connection member 26 includes a first branch 262 and a second branch 264. The first branch 262 and the second branch 264 both branch from the first incident branch 222 and are converged into the first output branch 242. In detail, the first connection member 26 further includes a first branching portion 266 and a first converging portion 268. The second branch 264 is interconnected between the first incident branch 222 and the first output branch 242. The first branch 262 is substantially parallel to the second branch 264. Opposite ends of the first branch 262 is coupled to the second branch 264 through the first branching portion 266 and the first converging portion 268. An included angle between the first branching portion 266 and the first branch 262 is substantially equal to an included angle between the first converging portion 268 and the first branch 262.

The second connection member 28 includes a third branch 282 and a fourth branch 284. The third branch 282 and the fourth branch 284 both branch from the second incident branch 224 and are converged into the second output branch 244. In detail, the second connection member 28 further includes a second branching portion 286 and a second converging portion 288. The third branch 282 is interconnected between the second incident branch 224 and the second output branch 244. The third branch 282 is substantially parallel to the fourth branch 284. Opposite ends of the fourth branch 284 is coupled to the third branch 282 through the second branching portion 286 and the second converging portion 288. The second branch 264 and the third branch 282 are sandwiched between the first branch 262 and the fourth branch 284. An included angle between the second branching portion 286 and the third branch 282 is substantially equal to an included angle between the second converging portion 288 and the third branch 282.

The pair of first modulating electrodes 30 are positioned on the top surface 102 and includes a first grounded electrode 32, a first modulated electrode 34, and a second modulated electrode 36. The first grounded electrode 32 is grounded and is arranged between the first branch 262 and the second branch 264. The first modulated electrode 34 and the first grounded electrode 32 are arranged at opposite sides of the first branch 262. The second modulated electrode 36 and the first grounded electrode 32 are arranged at opposite sides of the second branch 264. As a result, the pair of first modulating electrodes 30 and the first connection member 26 cooperatively form a push-pull configuration. In one embodiment, the first grounded electrode 32, the first modulated electrode 34, and the second modulated electrode 36 are substantially strip-shaped.

The pair of second modulating electrodes 40 are positioned on the top surface 102 and includes a second grounded electrode 42 and a third modulated electrode 44. The second grounded electrode 42 is grounded and covers the third branch 282, and the third modulated electrode 44 covers the fourth branch 284. As a result, the pair of second modulating electrodes 40 and the second connection member 28 cooperatively form a push-pull configuration. In one embodiment, the second grounded electrode 42 and the third modulated electrode 44 are substantially strip-shaped.

To avoid light waves being absorbed by the first grounded electrode 42 and the third modulated electrode 44, a buffer layer 50 is formed and sandwiched between the substrate 102 and the pair of second modulating electrodes 40. The buffer layer 50 can be made of silicon dioxide.

The electro-optic modulator 100 defines a central axis E. A central axis of the waveguide 20 coincides with the central axis E. That is, the central axis E coincides with a center axis of the incident portion 220 and a center axis of the output portion 240. The first incident branch 222 and the second incident branch 224 are symmetrical about the central axis E. The first output branch 242 and the second output branch 244 are symmetrical about the central axis E. The second branch 264 and the third branch 282 are symmetrical about the central axis E. The first branch 262 and the fourth branch 284 are symmetrical about the central axis E.

In one embodiment, the incident portion 220 and the output portion 240 are made of titanium for allowing both the TE mode and the TM mode to pass. The first incident branch 222, the first connection member 26, and the first output branch 242 are made of zinc for allowing the TE mode to pass and preventing the TM mode to pass. The second incident branch 224, the second connection member 28, and the second output branch 244 are made of gallium for allowing the TM mode to pass and preventing the TE mode to pass.

When in operation, light waves enter the electro-optic modulator 100 through the incident portion 220 and are divided into two portions through the first incident branch 222 and the second incident branch 224. Light waves traversing the first incident branch 222 are divided into two portions through the first branch 262 and the second branch 264 and are converged into the first output branch 242. Light waves traversing the second incident branch 224 are divided into two portions through the third branch 282 and the fourth branch 284 and are converged into the second output branch 244. Light waves traversing the first output branch 242 and light waves traversing the second output branch 244 are converged into the output portion 240. Light waves traversing the output portion 240 emit out of the electro-optic modulator 100.

In a coordinate system XYZ (see FIG. 1), wherein X axis is a vertical height of the substrate 10 (i.e., along a direction that is perpendicular to the top surface 102), Y axis is a horizontal width of the substrate 10 (i.e., along a direction that is parallel to the top surface 102 and perpendicular to the first to fourth branches 262, 264, 282, and 284), and Z axis is a crossways length of the substrate 10 (i.e., along a direction that is parallel to the first to fourth branches 262, 264, 282, and 284). The TE mode has an electric field component Ey vibrating along the Y axis only. The TM mode has an electric field component Ex vibrating along the X axis and a Ez vibrating along the Z axis.

Figure 2:
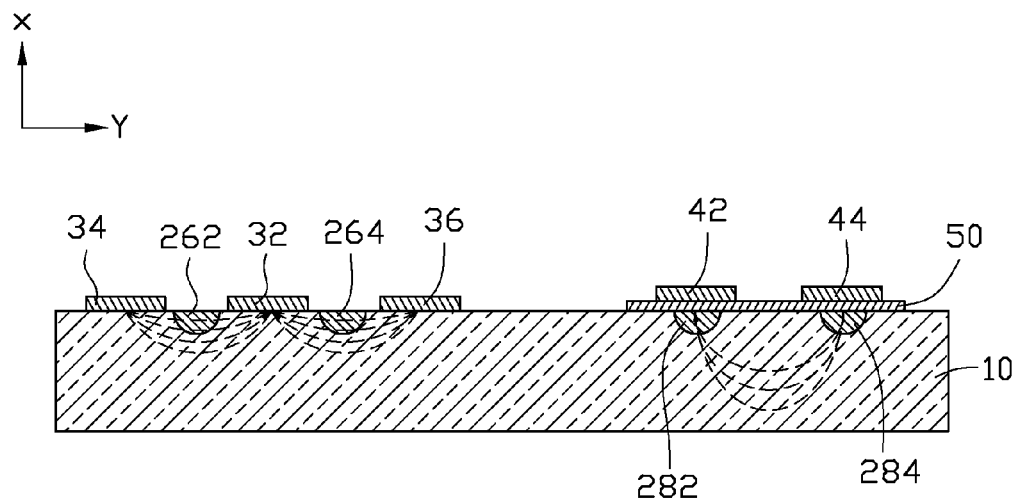
FIG. 2 is a cross-sectional view of the electro-optic modulator along a line II-II of FIG. 1

FIG. 1 together with FIG. 2 illustrate that as the first modulated electrode 34 and the first grounded electrode 32 are arranged at opposite sides of the first branch 262, a portion of the electric field generated between the first modulated electrode 34 and the first grounded electrode 32 and interacting with the first branch 262 is substantially parallel with the Y axis, and thus efficiently modulates the TE mode in the first branch 262 and alters the phase of the TE mode in the first branch 262. Similarly, as the second modulated electrode 36 and the first grounded electrode 32 are arranged at opposite sides of the second branch 264, a portion of the electric field generated between the second modulated electrode 36 and the first grounded electrode 32 and interacting with the second branch 264 is substantially parallel with the Y axis, and thus efficiently modulates the TE mode in the second branch 264 and alters the phase of the TE mode in the second branch 264. As the second grounded electrode 42 covers the third branch 282, and the third modulated electrode 44 covers the fourth branch 284, a portion of the electric field generated between the second grounded electrode 42 and the third modulated electrode 44 and interacting with the third branch 282 and the fourth branch 284 is substantially parallel with the X axis, and thus efficiently modulates the TM mode in the third branch 282 and the fourth branch 284 and alters the phase of the TM mode in the third branch 282 and the fourth branch 284.

During the above transmission process of light waves, the pair of first modulating electrodes 30 only modulates the TE mode traversing the first connection member 26, and the pair of second modulating electrodes 40 only modulates the TM mode traversing the second connection member 28. As such, the efficiency of the electro-optic modulator 100 is increased.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An electro-optic modulator comprising:
a substrate comprising a top surface;
a waveguide formed in the top surface and comprising a Y-shaped incident member, a Y-shaped output member, a first connection member allowing a TE mode to pass and preventing a TM mode to pass, and a second connection member for allowing the TM mode to pass and preventing the TE mode to pass, the Y-shaped incident member comprising an incident portion, a first incident branch, and a second incident branch, the Y-shaped output member comprising an output portion, a first output branch, and a second output branch; the first connection member comprising a first branch and a second branch, the second connection member comprising a third branch and a fourth branch, the first branch and the second branch interconnected between the first incident branch and the first output branch and arranged in parallel, the third branch and the fourth branch interconnected between the second incident branch and the second output branch and arranged in parallel;
first modulating electrodes comprising a first grounded electrode, a first modulated electrode, and a second modulated electrode, the first grounded electrode and the first modulated electrode arranged at opposite sides of the first branch, and the first grounded electrode and the second modulated electrode arranged at opposite sides of the second branch; and
second modulating electrodes comprising a third grounded electrode and a third modulated electrode, the third grounded electrode covering the third branch, and the third modulated electrode covering the fourth branch.

2. The electro-optic modulator of claim 1, wherein the first connection member comprises a first branching portion and a first converging portion, the first branch is substantially parallel to the second branch, and the first branching portion and the first converging portion obliquely connect opposite ends of the first branch to the second branch.

3. The electro-optic modulator of claim 2, wherein the second connection member comprises a second branching portion and a second converging portion, the third branch is substantially parallel to the fourth branch, and the second branching portion and the second converging portion obliquely connect the fourth branch to the third branch.

4. The electro-optic modulator of claim 3, wherein the second branch and the third branch are arranged between the first branch and the fourth branch.

5. The electro-optic modulator of claim 4, wherein the substrate is made of lithium niobate crystal.

6. The electro-optic modulator of claim 4, wherein the incident portion and the output portion are made of titanium.

7. The electro-optic modulator of claim 6, wherein the first incident branch, the first connection member, and the first output branch are made of zinc.

8. The electro-optic modulator of claim 7, wherein the second incident branch, the second connection member, and the second output branch are made of gallium.

9. The electro-optic modulator of claim 1, comprising a buffer layer formed and sandwiched between the substrate and the second modulating electrodes.

10. The electro-optic modulator of claim 9, wherein the buffer layer is made of silicon dioxide.

* * * * *